(12) United States Patent
Garcia et al.

(10) Patent No.: US 12,434,738 B2
(45) Date of Patent: Oct. 7, 2025

(54) METHOD FOR IDENTIFICATION OF EMERGENCY VEHICLE ROAD CLOSURES

(71) Applicant: GM Cruise Holdings LLC, San Francisco, CA (US)

(72) Inventors: Zachary Wright Garcia, San Francisco, CA (US); Changkai Zhou, Mountain View, CA (US); Kevin Yuwen Tong, Carlsbad, CA (US); Nestor Grace, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 282 days.

(21) Appl. No.: 18/176,923

(22) Filed: Mar. 1, 2023

(65) Prior Publication Data

US 2024/0294186 A1 Sep. 5, 2024

(51) Int. Cl.
*B60W 60/00* (2020.01)
*B60W 40/04* (2006.01)

(52) U.S. Cl.
CPC ........ *B60W 60/0011* (2020.02); *B60W 40/04* (2013.01); *B60W 60/0015* (2020.02); *B60W 2554/4041* (2020.02)

(58) Field of Classification Search
CPC ............ B60W 40/04; B60W 60/0015; B60W 60/0011; B60W 2554/4041
See application file for complete search history.

(56) References Cited

U.S. PATENT DOCUMENTS

2020/0372262 A1\* 11/2020 Ma et al. .............. B60W 40/04

\* cited by examiner

*Primary Examiner* — Anne Marie Antonucci
(74) *Attorney, Agent, or Firm* — CANTOR COLBURN LLP

(57) ABSTRACT

The disclosed technology provides solutions for determining, by an AV, whether a roadway is closed by determining and understanding the intent of the emergency vehicle. A method comprises navigating an autonomous vehicle (AV) along a roadway; receiving road data, by the AV, wherein the road data corresponds with at least one emergency vehicle; identifying the at least one emergency vehicle; determining a pose of the at least one emergency vehicle in relation to the roadway; and determining if the roadway is closed based on the pose of the emergency vehicle in relation to the roadway. Systems and machine-readable media are also provided.

20 Claims, 6 Drawing Sheets

METHOD FOR IDENTIFICATION OF EMERGENCY VEHICLE ROAD CLOSURES

BACKGROUND

1. Technical Field

The present disclosure generally relates to determining, by an autonomous vehicle (AV), whether a roadway is closed by an emergency vehicle and, more specifically, determining, by an AV, whether a roadway is closed by determining and understanding the intent of the emergency vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
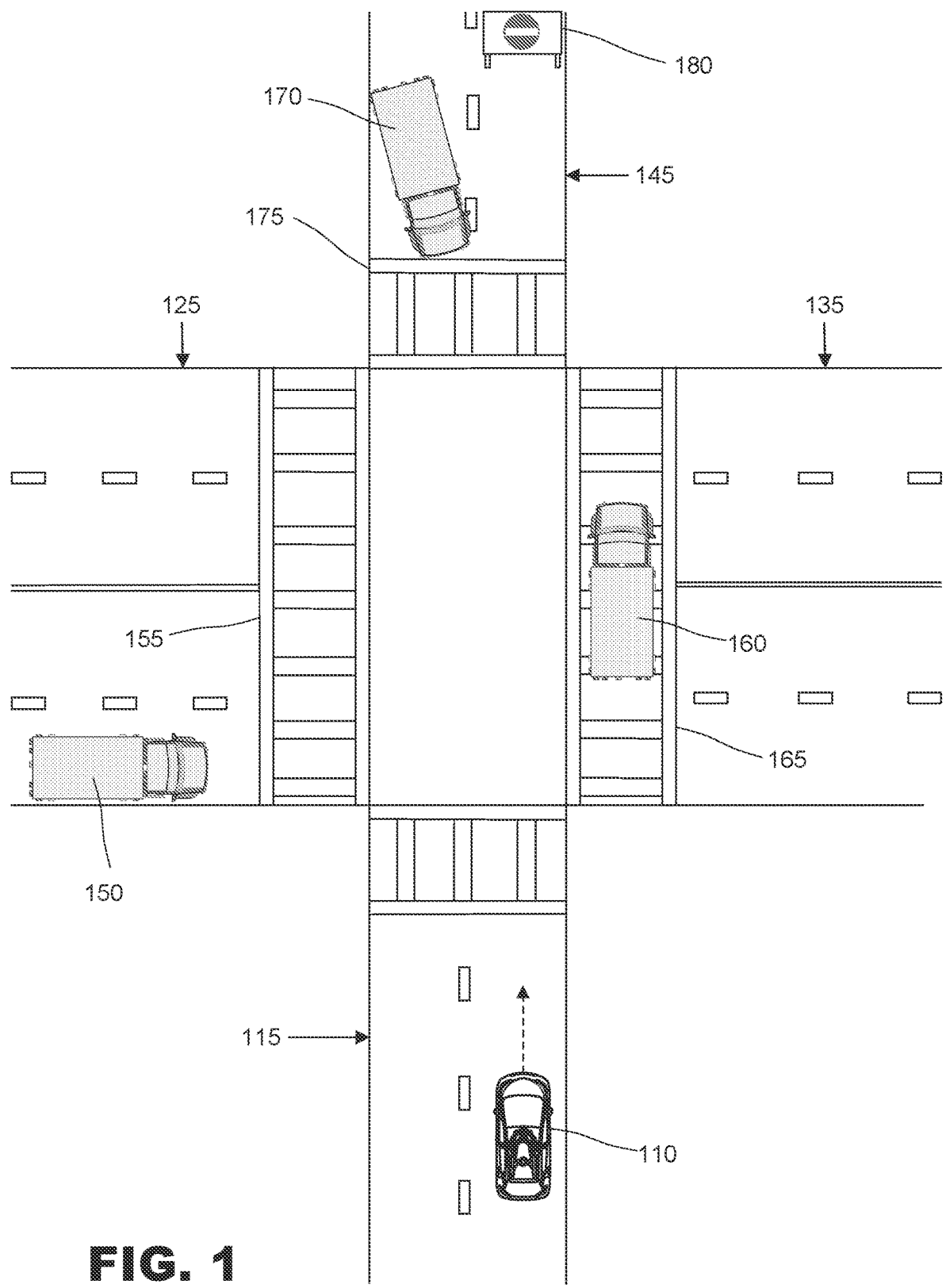
FIG. 1 illustrates a perspective view of an example autonomous vehicle (AV) travelling along a roadway and approaching an intersection that is closed in two directions and open in a third direction, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as described in more detail below. The sensor systems can include one or more types of sensors that can be arranged about the AV. In some examples, the AV can interpret sensor signals to detect and classify objects in the environment using a perception stack, as explained in more detail below. The perception stack can enable the AV to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems as well as other data sources. In some examples, the AV controller relies on the correct detection, classification, and understanding of the objects in the AVs environment to subsequently provide commands for the actuators that control the AV's steering, throttle, brake, and drive unit. In addition to correctly detecting and classifying objects in the AV's environment, it can also be important for the AV to understand the purpose of detected objects in the AV's environment so that the AV can react accordingly and control the AV in a safe and effective manner based on the intended purpose of the objects detected in the AV's environment.

For example, emergency vehicles are one example of a type of object that the AV can detect and classify in its environment using the perception stack. Some examples of emergency vehicles include, but are not limited to, ambulances, police vehicles, meter maid vehicles, and fire trucks. In some scenarios, an emergency vehicle can be double-parked on a roadway that the AV is travelling along. In these scenarios, the AV's perception stack can detect and classify the object that it is approaching as an emergency vehicle and also determine whether the emergency vehicle is flashing its emergency lights. In some examples, if the detected emergency vehicle is stationary (e.g., not moving) and the AV controller determines that sufficient space exists for the AV to proceed around the emergency vehicle, the AV's planning stack will instruct the AV to proceed safely around and pass the stationary emergency vehicle. In some examples, this result of the AV proceeding around the emergency vehicle is acceptable. For example, the emergency vehicle may be double-parked while EMTs, police, firefighters, or other emergency personnel are outside of the emergency vehicle performing their duties, and not intended to block traffic along the roadway. In some examples, however, this result of the AV proceeding around the emergency vehicle is not acceptable. For example, if the emergency vehicle is parked with the intention of blocking the roadway from traffic.

For example, an emergency vehicle can be parked at a location with the purpose to temporarily close a roadway (or a portion of a roadway) from traffic for public safety (or any other reason). In some examples, the AV can detect that there is sufficient space on either side of the parked emergency vehicle for the AV to proceed around the parked emergency vehicle and along the closed roadway, even though the emergency vehicle is parked with the purpose of blocking the roadway. In some examples, proceeding past an emergency vehicle parked in order to close a roadway (or portion of a roadway) can place the AV in a dangerous, hazardous, and/or illegal position, and is therefore undesirable. In some examples, proceeding past an emergency vehicle parked to close a roadway (or portion of a roadway) can also endanger the safety of emergency personnel and/or innocent bystanders, or cause damage to the AV. It is therefore desirable for the AV to not only detect and classify emergency vehicles, but also for the AV to understand the purpose of the detected emergency vehicle (e.g., whether the emergency vehicle is positioned to close a roadway to traffic). In some examples, if the AV's controller can confidently determine that the emergency vehicle is temporarily blocking the roadway (e.g., the roadway is temporarily closed to traffic), the AV can reroute its path to avoid the temporarily closed roadway and any danger or hazards associated with the closed roadway. In some examples, the emergency vehicle that is intending to block a roadway can be positioned in the middle of a roadway (e.g., not near an intersection). In this scenario, the AV's controller can confidently determine that the emergency vehicle is temporarily blocking the roadway (e.g., the roadway is temporarily closed to traffic), and the AV can reroute its path to avoid the temporarily closed roadway and any danger or hazards associated with the closed roadway by performing any necessary maneuver (such as, for example, a U-turn or K-turn).

In some examples, the perception stack can determine whether the parked emergency vehicle is intending to block a roadway by accounting for various context clues in the environment and weighing them to predict the probability that the emergency vehicle is, in fact, intending to close the roadway to traffic. In some examples, if the perception stack detects that the emergency vehicle is moving (e.g., not parked), it can use this information to determine that the emergency vehicle is likely not intending to block traffic (and close a roadway) since a moving emergency vehicle is unlikely to block a stationary roadway. In some examples, the perception stack can detect whether the emergency vehicle's flashing lights are activated and use this knowledge, together with other detected context clues (such as the fact that the emergency vehicle is parked and not moving), to help determine whether the emergency vehicle intends to close the roadway. In some examples, the perception stack can also detect and use the pose of the parked emergency vehicle to help determine whether the emergency vehicle intends to the close the roadway. In some examples, an emergency vehicle's pose is the direction that the emergency vehicle is pointing with regard to the direction of traffic on a roadway. For example, the perception stack can detect that the pose of the parked emergency vehicle is perpendicular (or close to perpendicular), or parallel (or close to parallel) to the flow of traffic of the roadway, and subsequently can use this information, together with other detected context clues, to help determine whether the emergency vehicle intends to close the roadway. In some examples, an emergency vehicle parked perpendicular to the flow of traffic on a roadway is more likely to be parked with the intent to close a roadway, than an emergency vehicle parked parallel to the flow of traffic on a roadway. In some examples, an emergency vehicle parked parallel to the flow of traffic on the roadway can simply be double-parked for a myriad of reasons, none of which likely include purposefully blocking traffic to temporarily close a roadway.

In some examples, after the perception stack of the AV has detected and classified an object as an emergency vehicle and determined whether the emergency lights are flashing, the perception stack can further associate various other detected objects in the environment with the detected emergency vehicle to help determine whether the emergency vehicle intends to block (and therefore close) a roadway. For example, the detection and classification of other objects proximate to the emergency vehicle such as caution tape, road cones, signs, and/or road flares (or any other item commonly understood to assist in temporarily closing a roadway) by the perception stack increases the probability that the emergency vehicle is intending to the block the roadway. In some examples, the perception stack can also associate known semantic map data with the detected emergency vehicle to help determine whether the emergency vehicle intends to close the roadway. In some examples, known semantic map data can include the location of crosswalks, among other information. In some examples, when a parked emergency vehicle is positioned perpendicular (or close to perpendicular) to the flow of traffic on the roadway, and also located in (or partially in) a crosswalk, the perception stack can determine that the emergency vehicle is likely intending to block traffic and therefore the roadway is likely temporarily closed. In some examples, the perception stack can weigh each of these factors: whether the emergency vehicle is stationary or moving, whether the emergency lights of the emergency vehicle are activated, whether other objects related to closed roads (e.g., caution tape, signs, etc.) are proximate the emergency vehicle, the pose of the emergency vehicle with respect to the flow of traffic on the roadway, whether the emergency vehicle is parked in a cross walk, and other factors. In some examples, some of these factors can be stronger indicators of whether the emergency vehicle intends to close a roadway and other factors can be weaker indicators. In some examples, the perception stack of the AV can employ an algorithm that accounts for each of these factors in order to predict whether the roadway is closed to traffic.

FIG. 1 illustrates a perspective view of an example AV 110 travelling along a roadway 115 (in the direction indicated by the arrow) and approaching an intersection that is closed in two directions (e.g., roadway 135 and roadway 145) and open in a third direction (e.g., roadway 125). FIG. 1. depicts at least three example scenarios to illustrate portions of the invention disclosed herein. In the first example, AV 110 is travelling along roadway 115 following a preplanned route that intends to direct the AV 110 to turn right at the intersection and proceed along roadway 135. However, in this example, emergency vehicle 160 is parked perpendicular to the flow of traffic on roadway 135 within crosswalk 165 and is intending to block roadway 135 from traffic. In this example, as the AV 110 travels along roadway 115, the sensors mounted about AV 110 can detect the object (e.g., emergency vehicle 160) once the object comes into view of the AV 110's sensors and provide signals to the AV 110's perception stack for classification of the object (e.g., emergency vehicle 160).

In some examples, the AV 110's perception stack can classify the object (e.g., emergency vehicle 160) as an emergency vehicle. In some examples, the AV 110's perception stack can also interpret the signals received from the AV 110's sensors to further determine if the emergency lights located on emergency vehicle 160 are activated. As illustrated in FIG. 1, AV 110 is sized so that there is sufficient space on either side of the emergency vehicle 160 for the AV 110 to drive by emergency vehicle 160 and proceed along roadway 135. Therefore, in some examples, it can be important for the AV 110 to understand that emergency vehicle 160 is purposefully parked in crosswalk 165 to block traffic, thereby temporarily closing roadway 135. In some examples, if AV 110 does not understand that roadway 135 is closed to traffic, the controller of AV 110 can direct AV 110 to proceed around emergency vehicle 160 and down roadway 135 since there is sufficient space for AV 110 to proceed on either side of emergency vehicle 160. As discussed above, doing so could result in a potentially dangerous, hazardous, or even illegal scenario for AV 110.

In some examples, the perception stack of AV 110 can interpret various detected context clues in AV 110's environment to determine whether emergency vehicle 160 intends to close roadway 135. In this first example where AV 110 intends to turn right onto roadway 135, in addition to detecting and classifying the object (e.g., emergency vehicle 160) as an emergency vehicle and detecting whether the emergency lights located on emergency vehicle 160 are activated, the perception stack can also determine the pose of emergency vehicle 160. In this example, the pose of emergency vehicle 160 is perpendicular to the flow of traffic on roadway 135. In some examples, the perception stack can also associate known semantic map data with the detected and classified emergency vehicle 160 to understand that emergency vehicle 160 is parked in a crosswalk. In some examples, the perception stack can take each of these factors into account (e.g., emergency vehicle 160 is stationary, the emergency lights located on emergency vehicle 160 are activated, the pose of emergency vehicle 160 is perpendicular to the flow of traffic, and emergency vehicle 160 is parked in a crosswalk) and make a logical determination of whether roadway 135 is closed to traffic. In this first example, AV 110 can correctly determine that roadway 135 is closed to traffic prior to AV 110 reaching the intersection and subsequently AV 110's controller can dynamically reroute the AV 110 to avoid roadway 135 and still reach the intended destination.

In a second example of the at least three examples depicted in FIG. 1, AV 110 is travelling along roadway 115 following a preplanned route that intends to direct the AV 110 to continue straight ahead at the intersection and proceed along roadway 145. However, in this example, emergency vehicle 170 is parked outside of crosswalk 175, mostly parallel to the flow of traffic on roadway 145, but is still intending to block roadway 145 from traffic. In this example, sign 180 is also positioned in roadway 145, proximate to emergency vehicle 170. In some examples, sign 180 can be a sign indicating that roadway 145 is closed to traffic. In this example, as the AV 110 travels along roadway 115, the sensors mounted about AV 110 can detect the first object (e.g., emergency vehicle 170) once it comes into view of the AV 110's sensors and provide signals to the AV 110's perception stack for classification of the object (e.g., emergency vehicle 170). Additionally, in this example, AV 110 can detect the second object (e.g., sign 180) once it comes into view of the AV 110's sensors and provide signals to the AV 110's perception stack for classification of the object (e.g., sign 180). In some examples, the second object can be a road flare, caution tape, or any other item that indicates that a roadway may be closed.

In some examples, the AV 110's perception stack can classify the first object (e.g., emergency vehicle 170) as an emergency vehicle. In some examples, the AV 110's perception stack can also interpret the signals received from the AV 110's sensors to further determine if the emergency lights located on emergency vehicle 170 are activated. In some examples, the AV 110's perception stack can classify the second object (e.g., sign 180) as a road closure sign. FIG. 1 is intended to illustrate that AV 110 is sized so that the AV 110's controller can determine that sufficient space exists between emergency vehicle 170 and sign 180 for the AV 110 to drive between them and proceed along roadway 145. Therefore, in some examples, it can be important for the AV 110 to understand that emergency vehicle 170 is purposefully parked to indicate that roadway 145 is closed to traffic. In some examples, if AV 110 does not understand that roadway 145 is closed to traffic, the controller of AV 110 can direct AV 110 to proceed between emergency vehicle 170 and sign 180 and proceed down roadway 145 since there is sufficient space for AV 110 to proceed between the objects. As discussed above, doing so could result in a potentially dangerous, hazardous, or even illegal scenario for AV 110.

In some examples, the perception stack of AV 110 can interpret various detected context clues in AV 110's environment to determine whether emergency vehicle 170 intends to close roadway 145. In this second example where AV 110 intends to proceed directly onto roadway 145, in addition to detecting and classifying the first object (e.g., emergency vehicle 170) as an emergency vehicle and detecting whether the emergency lights located on emergency vehicle 170 are activated, the perception stack can also determine the pose of emergency vehicle 170. In this example, the pose of emergency vehicle 170 is mostly parallel to the flow of traffic on roadway 145. In some examples, the perception stack can also associate known semantic map data with the detected and classified emergency vehicle 170 to understand that emergency vehicle 170 is not parked in a crosswalk. In some examples, the perception stack can determine that sign 180 is an object related to road closures and also proximate to emergency vehicle 170. In some examples, the perception stack can then associate the sign 180 with emergency vehicle 170 due to the proximity of the two objects. In some examples, the perception stack can take each of these factors into account (e.g., emergency vehicle 170 is stationary, the emergency lights located on emergency vehicle 170 are activated, the pose of emergency vehicle 170 is parallel to the flow of traffic, emergency vehicle 170 is not parked in a crosswalk, emergency vehicle 170 is parked proximate to sign 180) and make a logical determination of whether roadway 145 is closed to traffic. In some examples, some of these factors can be indications that the emergency vehicle 170 does not intend on closing roadway 145 (e.g., the pose of emergency vehicle 170 is parallel to the flow of traffic and emergency vehicle 170 is not parked in a crosswalk). However, in some examples, other factors (e.g., emergency vehicle 170 is stationary, the emergency lights located on emergency vehicle 170 are activated, and the emergency vehicle 170 is parked proximate to sign 180) can outweigh the first factors so that the AV 110's perception stack will correctly determine that roadway 145 is closed to traffic. In this second example, AV 110 can correctly determine that roadway 145 is closed to traffic prior to AV 110 reaching the intersection and subsequently AV 110's controller can dynamically reroute the AV 110 to avoid roadway 145 and still reach the intended destination.

In a third example of the at least three examples depicted in FIG. 1, AV 110 is travelling along roadway 115 following a preplanned route that intends to direct the AV 110 to turn left at the intersection and proceed along roadway 125. In this example, emergency vehicle 150 is parked parallel to the flow of traffic on roadway 125 and is not intending to block traffic or close roadway 125. In this example, as the AV 110 travels along roadway 115, the sensors mounted about AV 110 can detect the object (e.g., emergency vehicle 150) once the object comes into view of the AV 110's sensors and provide signals to the AV 110's perception stack for classification of the object (e.g., emergency vehicle 150).

In some examples, the AV 110's perception stack can classify the object (e.g., emergency vehicle 150) as an emergency vehicle. In some examples, the AV 110's perception stack can also interpret the signals received from the AV 110's sensors to further determine if the emergency lights located on emergency vehicle 150 are activated. As illustrated in FIG. 1, because emergency vehicle 150 is parallel parked on the side of roadway 125, there is sufficient space for the AV 110 to drive by emergency vehicle 150 and proceed along roadway 125. However, in some examples, it can be important for the AV 110 to understand whether emergency vehicle 150 is purposefully parked in roadway 125 to block traffic, thereby temporarily closing roadway 125.

As in the other examples, the perception stack of AV 110 can interpret various detected context clues in AV 110's environment to determine whether emergency vehicle 150 intends to close roadway 125. In this third example where AV 110 intends to turn left onto roadway 125, in addition to detecting and classifying the object (e.g., emergency vehicle 150) as an emergency vehicle and detecting whether the emergency lights located on emergency vehicle 150 are activated, the perception stack can also determine the pose of emergency vehicle 150. In this example, the pose of emergency vehicle 150 is parallel to the flow of traffic on roadway 125. In some examples, the perception stack can also associate known semantic map data with the detected and classified emergency vehicle 150 to understand that emergency vehicle 150 is not parked in a crosswalk (e.g., crosswalk 155). In some examples, the perception stack can take each of these factors into account (e.g., emergency vehicle 150 is stationary, the emergency lights located on emergency vehicle 150 are activated, the pose of emergency vehicle 150 is parallel to the flow of traffic, and emergency vehicle 150 is not parked in crosswalk 155) and make a logical determination of whether roadway 125 is closed to traffic. In this third example, AV 110 can correctly determine that roadway 125 is not closed to traffic and proceed along the planned route down roadway 125.

Figure 2:
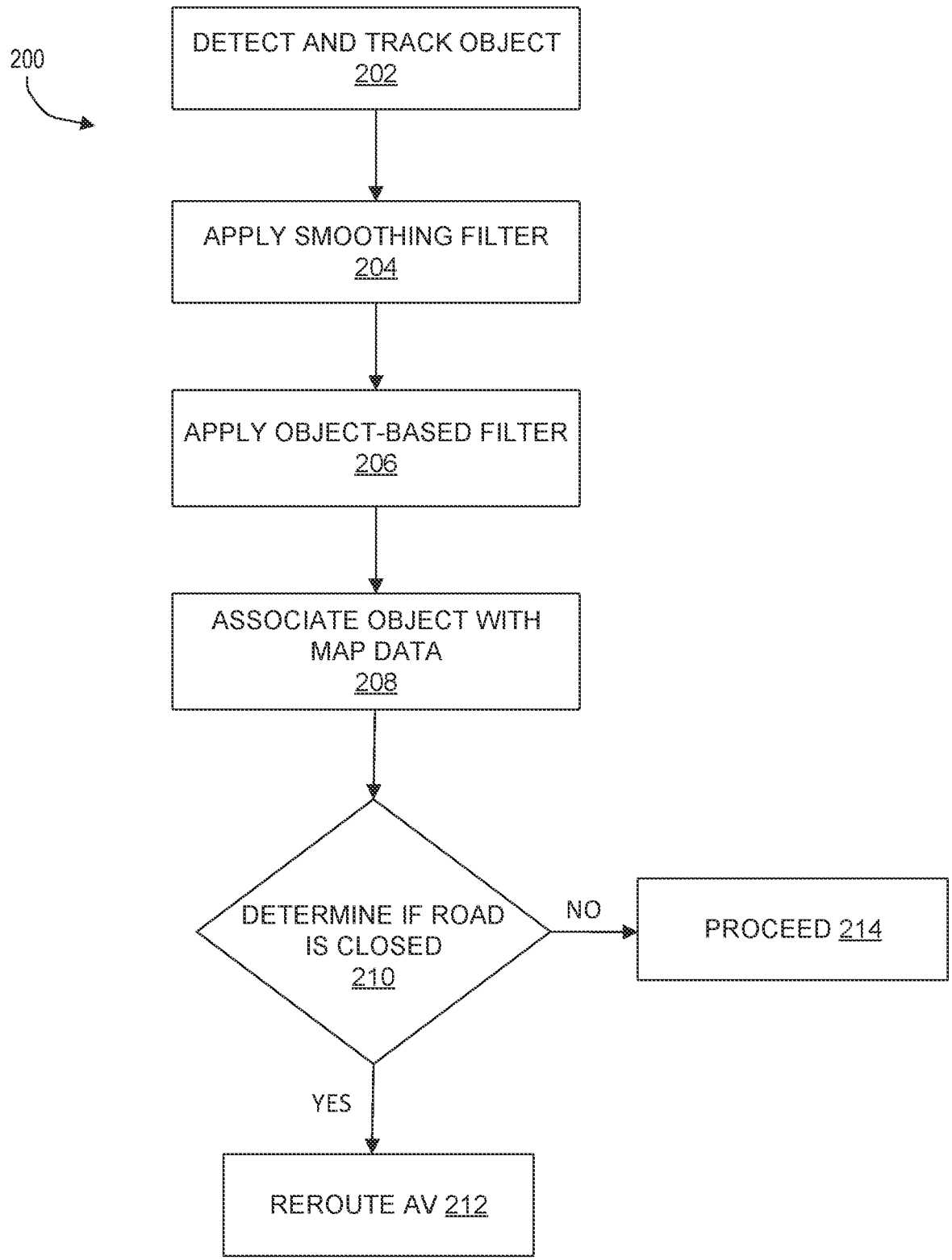
FIG. 2 illustrates a flow diagram of an example method for determining, by an AV, if a roadway is closed by an emergency vehicle, according to some examples of the present disclosure.

FIG. 2 illustrates a flow diagram of an example method for determining, by an AV, if a roadway is closed by an emergency vehicle. At block 202, the process 200 can include the AV 110 using mounted sensors to collect sensor data of the objects located in the AV 110's environment. In some examples, the sensor data can include signals received from cameras, LIDAR sensors, infrared sensors, and any other sensors mounted about the AV 110. In some examples, the sensor data can include camera images, including images of one or more emergency vehicles within the AV 110's environment. In some examples, the AV 110's perception stack can interpret the sensor data to detect and classify one or more objects as emergency vehicles. In some examples, the AV 110's perception stack can provide a bounding area around the detected object (e.g., the emergency vehicle) that can be associated with a semantic label that identifies the type of object that is within the bounding area as an emergency vehicle, the kinematic of the object (information about its movement), a tracked path of the object, and a description of the pose of the object (its orientation or heading, etc.). Therefore, in some examples, at step 202, the perception stack can determine which detected objects in the environment are emergency vehicles and also track the locations of each object. In some examples, the output of this first block 202 can be an existence probability for detected emergency vehicles. In some examples, an existence probability is the probability that the tracked object is an emergency vehicle.

At block 204, the process 200 can include the perception stack applying a smoothing filter to the existence probability of detection of the one or more emergency vehicles of step 202 in order to determine a confidence that the detected objects are emergency vehicles and a confidence of whether the emergency vehicles are stationary or moving. In some examples, the perception stack can analyze the frames of the received camera sensor signals to determine the confidence that detected objects are parked emergency vehicles. In some examples, if the perception stack detects the emergency vehicle in multiple frames (e.g., 2 or more frames), the perception stack can determine whether the emergency vehicle is stationary or moving. In some examples, the perception stack can use a length of time that the AV 110's sensors captured the emergency vehicle object to determine the confidence that the detected object is an emergency vehicle of interest. In some cases, at step 204, the perception stack can determine a classification score to determine the confidence that the detected object is an emergency vehicle and whether the emergency vehicle is stationary or moving. In some examples, the classification score can be determined based on a threshold based on the amount of time or number of frames the object is detected by the sensors.

At block 206, the process 200 can include applying an object-based filter to the classification score determined at block 204 in order to filter out detected emergency vehicles that are not relevant to emergency vehicle road closure detection. In some examples, the perception stack can detect and classify an object as an emergency vehicle, but the detected emergency vehicle can subsequently be filtered out of the emergency vehicle road closure detection because it can be determined that the detected emergency vehicle is not purposefully blocking traffic to close a roadway. In some examples, the perception stack will filter out an emergency vehicle detected at a far distance from the AV (e.g., more than 60 meters). In some examples, the distance can vary. In some examples, the perception stack can place lower confidence in the correct classification of an emergency vehicle detected at such a distance. In some examples, the object-based filter can remove detected emergency vehicles that are moving (i.e., not parked) since moving emergency vehicles are unlikely to be purposefully blocking a roadway. In some examples, applying the object-based filter can avoid false positives wherein the perception stack erroneously determines than an emergency vehicle is blocking a roadway that the AV has planned to travel along and therefore reroutes the AV unnecessarily. In some examples, rerouting an AV unnecessarily can waste computing system resources within the AV itself as well as waste time for the AV to reach its intended destination.

At block 208, the process 200 can include the perception stack associating the detected emergency vehicle object with semantic map elements in order to help determine whether the emergency vehicle object intends to block a roadway. In some examples, associating the detected emergency vehicle object with semantic map elements can include determining whether the detected emergency vehicle object is parked in a crosswalk at an intersection (e.g., crosswalk 165), parked at a location mid-block, parked in the middle of an intersection, or any other location that can be determined by associating semantic map data with the tracked location of the detected emergency vehicle object. In some examples, semantic map elements can include lanes, intersections, and crosswalks, among other elements of importance to ultimately determining whether the emergency vehicle object intends to block a roadway from traffic. In some examples, associating the detected emergency vehicle object with semantic map elements can include categorizing the detected emergency vehicle object depending on whether it is blocking a single lane, an entire roadway, or an entire intersection, among other categories.

At block 208, the process 200 can include the perception stack applying conditions to determine whether the roadway is likely closed to traffic by the detected emergency vehicle. In some examples, the perception stack can determine the pose of the emergency vehicle (e.g., parallel or perpendicular to the flow of traffic on the roadway). In some examples, an emergency vehicle with a pose that is determined to be over 25° relative to the side of the roadway can be considered to be perpendicular to the roadway. In some examples, the perception stack can associate more than one detected emergency vehicles with each other as a condition that the roadway is likely closed to traffic. In some examples, the distance from the side of the road to the location of the detected emergency vehicle can also be used by the perception stack as a condition to determine whether the roadway is likely closed to traffic. In some examples, the closer the emergency vehicle is parked to the side of the roadway, the more likely that the emergency vehicle is simply pulled over and parked (i.e., not intending to block traffic along the roadway), while the closer to the middle of the roadway the emergency vehicle is located, the more likely that the emergency vehicle is intending to block the traffic. As discussed above, in some examples, the process that the perception stack employs to determine whether the detected emergency vehicle is intentionally blocking a roadway can include several inputs, each weighted differently, to logically determine whether the AV can proceed down the roadway or whether the roadway is closed and the AV therefore needs to reroute to reach its destination. In some examples, at step 212, if it is determined by the perception stack that the detected emergency vehicle is likely parked with the intention of blocking the roadway that the AV has planned to travel through, the AV controller can dynamically reroute the AV to avoid the closed roadway. In some examples, at step 214, if it is determined by the perception stack that the detected emergency vehicle is likely not parked with the intention of blocking the roadway that the AV has planned to travel through, the AV can continue on its journey along the roadway as intended.

Figure 3:
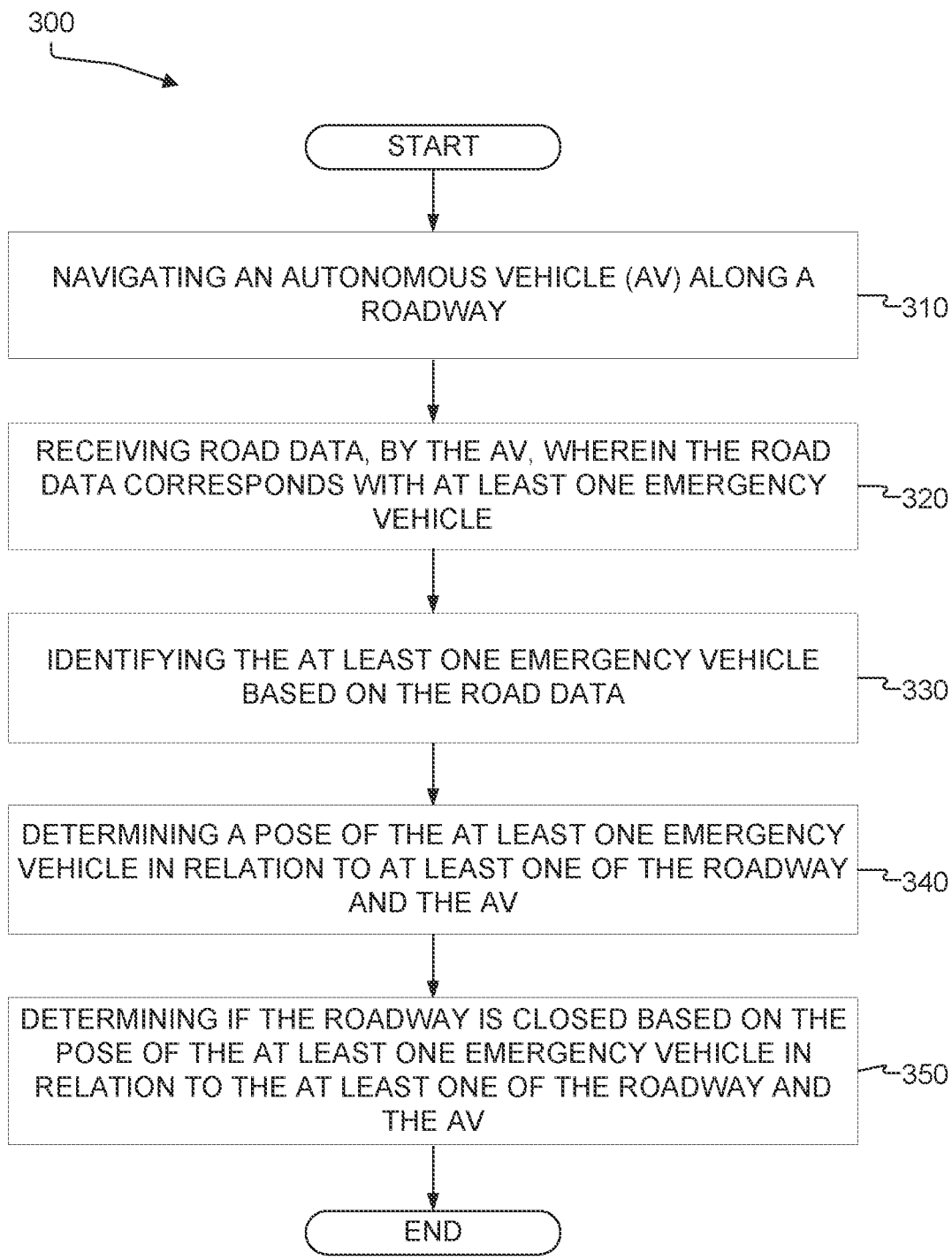
FIG. 3 illustrates a flow diagram of an example method for determining, by an AV, if a roadway is closed based on the pose of an emergency vehicle in relation to the roadway, according to some examples of the present disclosure.

FIG. 3 illustrates a flow diagram of an example method for determining, by an AV, if a roadway is closed based on the pose of an emergency vehicle in relation to the roadway. At block 310, the process 300 can include navigating an autonomous vehicle (e.g., AV 110) along a roadway. For example, AV 110 is depicted travelling along a roadway 115 (in the direction indicated by the arrow) and approaching an intersection that is closed in two directions (e.g., roadway 135 and roadway 145) and open in a third direction (e.g., roadway 125) as shown in FIG. 1. In some examples, AV 110 can have a preplanned route that it is travelling along to reach a destination.

At block 320, the process 300 can include receiving road data, by the AV (e.g., AV 110), wherein the road data corresponds with at least one emergency vehicle. In some examples, road data can comprise sensor signals generated by the sensor systems arranged about the AV. For example, as the AV 110 travels along roadway 115, the sensors mounted about AV 110 can detect objects (e.g., emergency vehicles 150, 160, 170, and sign 180) once the object comes into view of the AV 110's sensors and provide signals to the AV 110's perception stack for classification of the objects. In some examples, the sensor data can include camera images, including images of one or more emergency vehicles within the AV 110's environment. In some examples, the AV 110's perception stack can interpret the sensor data to detect and classify one or more objects as emergency vehicles.

At block 330, the process 300 can include identifying the at least one emergency vehicle based on the road data. The AV 110's perception stack can detect and classify objects and determine their current locations, speeds, directions, and the like. For example, emergency vehicles are one example of a type of object that the perception stack of the AV can detect and classify in its environment. Some examples of emergency vehicles include, but are not limited to, ambulances, police vehicles, meter maid vehicles, and fire trucks. In one example illustrated in FIG. 1, as the AV 110 travels along roadway 115, the sensors mounted about AV 110 can detect an object (e.g., emergency vehicle 170) once it comes into view of the AV 110's sensors and provide signals to the AV 110's perception stack for classification of the object (e.g., emergency vehicle 170).

At block 340, the process 300 can include determining a pose of the at least one emergency vehicle in relation to at least one of the roadway and the AV. In some examples, the perception stack can detect and use the pose of the parked emergency vehicle to help determine whether the emergency vehicle intends to the close the roadway. In some examples, an emergency vehicle's pose is the direction that the emergency vehicle is pointing with regard to the direction of traffic on a roadway. For example, the perception stack can detect that the pose of the parked emergency vehicle is perpendicular (or close to perpendicular), or parallel (or close to parallel) to the flow of traffic of the roadway, and subsequently can use this information, together with other detected context clues, to help determine whether the emergency vehicle intends to close the roadway.

At block 350, the process 300 can include determining if the roadway is closed based on the pose of the at least one emergency vehicle in relation to the at least one of the roadway and the AV. In some examples, an emergency vehicle parked perpendicular to the flow of traffic on a roadway is more likely to be parked with the intent to close a roadway, than an emergency vehicle parked parallel to the flow of traffic on a roadway. In some examples, an emergency vehicle parked parallel to the flow of traffic on the roadway can simply be double-parked for a myriad of reasons. In one example described above with reference to FIG. 1, the pose of emergency vehicle 160 is perpendicular to the flow of traffic on roadway 135. In some examples, the perception stack can take this factor (e.g., the pose of the emergency vehicle) into account and make a logical determination of whether roadway 135 is closed to traffic. In this first example, AV 110 can correctly determine that roadway 135 is closed to traffic prior to AV 110 reaching the intersection based on the pose of emergency vehicle 160 and subsequently AV 110's controller can dynamically reroute the AV 110 to avoid roadway 135 and still reach the intended destination.

Figure 4:
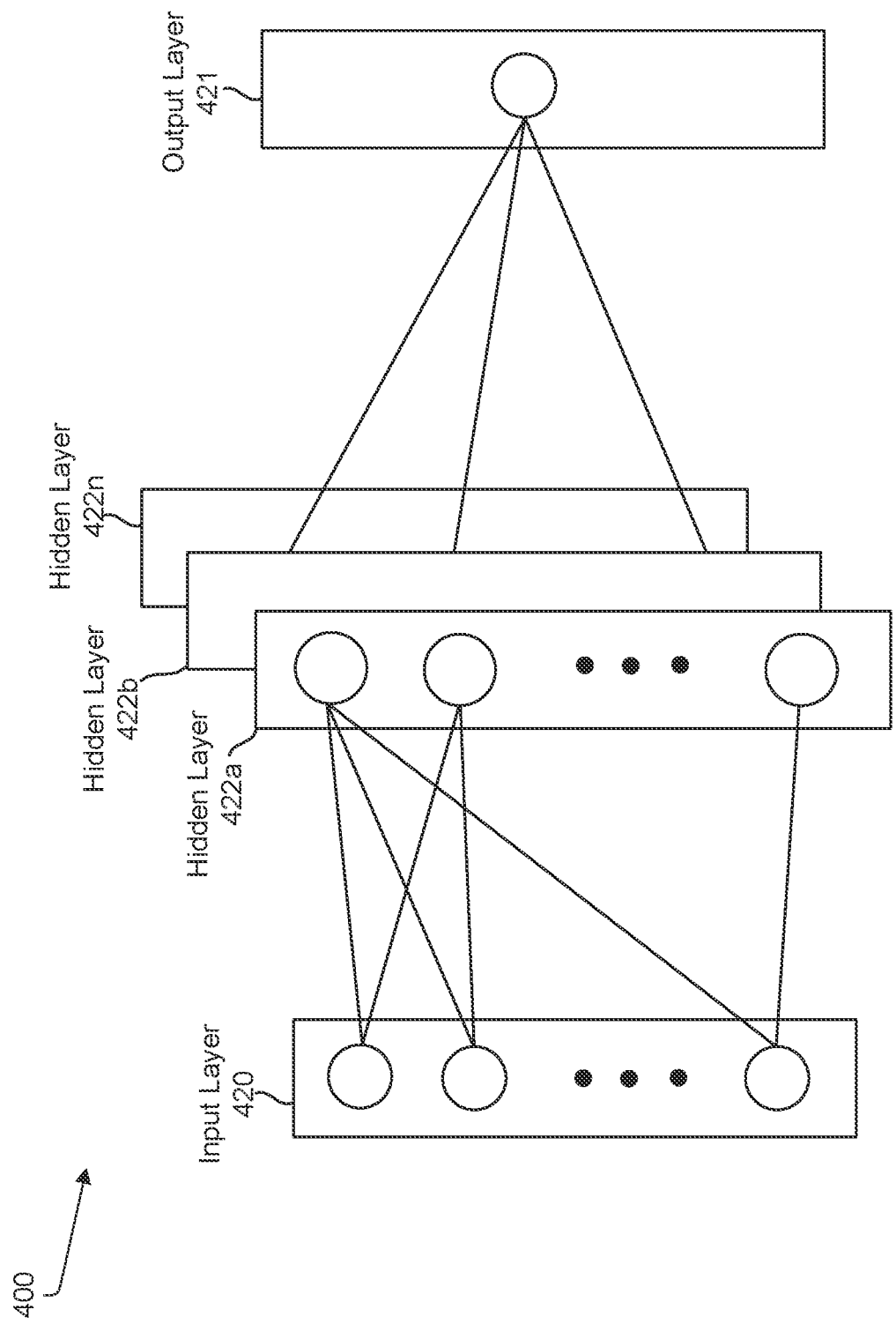
FIG. 4 illustrates an example of a deep learning neural network that can be used for determining, by an AV, if a roadway is closed by an emergency vehicle, according to some aspects of the disclosed technology.

In some examples, the methods described here can be implemented in the AV's perspective stack. In some examples, the methods described here can be implemented by machine learning models. In FIG. 4, the disclosure now turns to a further discussion of models that can be used through the environments and techniques described herein. FIG. 4 is an example of a deep learning neural network 400 that can be used to implement all or a portion of the systems and techniques described herein (e.g., neural network 400 can be used to determine if a roadway is closed by an emergency vehicle). An input layer 420 can be configured to receive sensor data and/or data relating to an environment surrounding an AV. Neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. Neural network 400 further includes an output layer 421 that provides an output resulting from the processing performed by the hidden layers 422a, 422b, through 422n.

Neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(½ (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
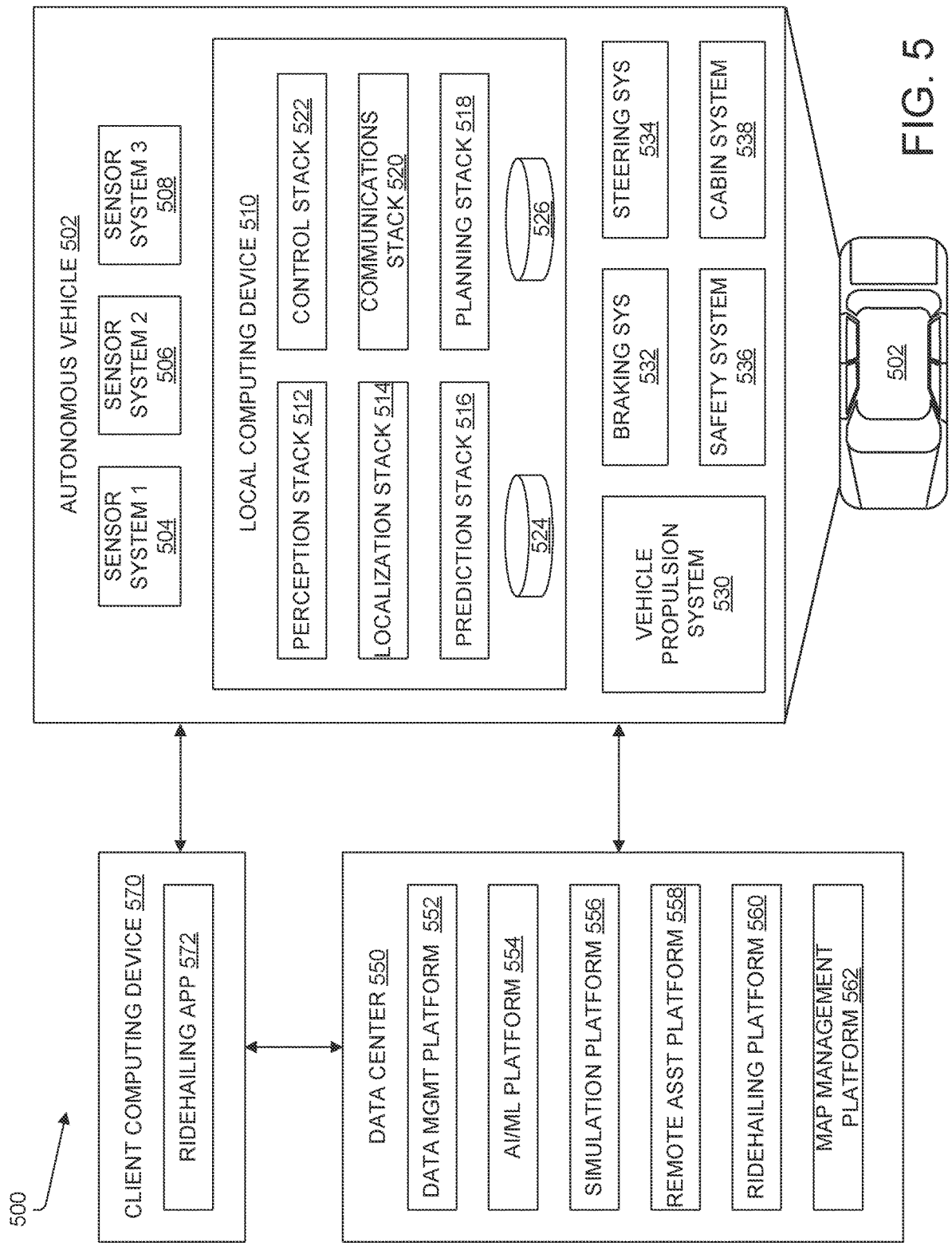
FIG. 5 illustrates an example system environment that can be used to facilitate autonomous vehicle (AV) dispatch and operations, according to some aspects of the disclosed technology.

FIG. 5 is a diagram illustrating an example autonomous vehicle (AV) environment 500, according to some examples of the present disclosure. One of ordinary skill in the art will understand that, for AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the perception stack 512 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

Prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

Planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

Control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

Communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

Data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ride-hailing service (e.g., a ridesharing service), a delivery service, a remote/roadside assistance service, street services (e.g., street mapping, street patrol, street cleaning, street metering, parking reservation, etc.), and the like.

Data center 550 can send and receive various signals to and from the AV 502 and the client computing device 570. These signals can include sensor data captured by the sensor systems 504-508, roadside assistance requests, software updates, ride-hailing/ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ride-hailing platform 560, and a map management platform 562, among other systems.

Data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ride-hailing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

Simulation platform 556 can enable testing and validation of the algorithms, machine learning models, neural networks, and other development efforts for the AV 502, the remote assistance platform 558, the ride-hailing platform 560, the map management platform 562, and other platforms and systems. Simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

Remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

Ride-hailing platform 560 can interact with a customer of a ride-hailing service via a ride-hailing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 572. The client computing device 570 can be a customer's mobile computing device or a computing device integrated with the AV 502 (e.g., the local computing device 510). The ride-hailing platform 560 can receive requests to pick up or drop off from the ride-hailing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ride-hailing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 6.

Figure 6:
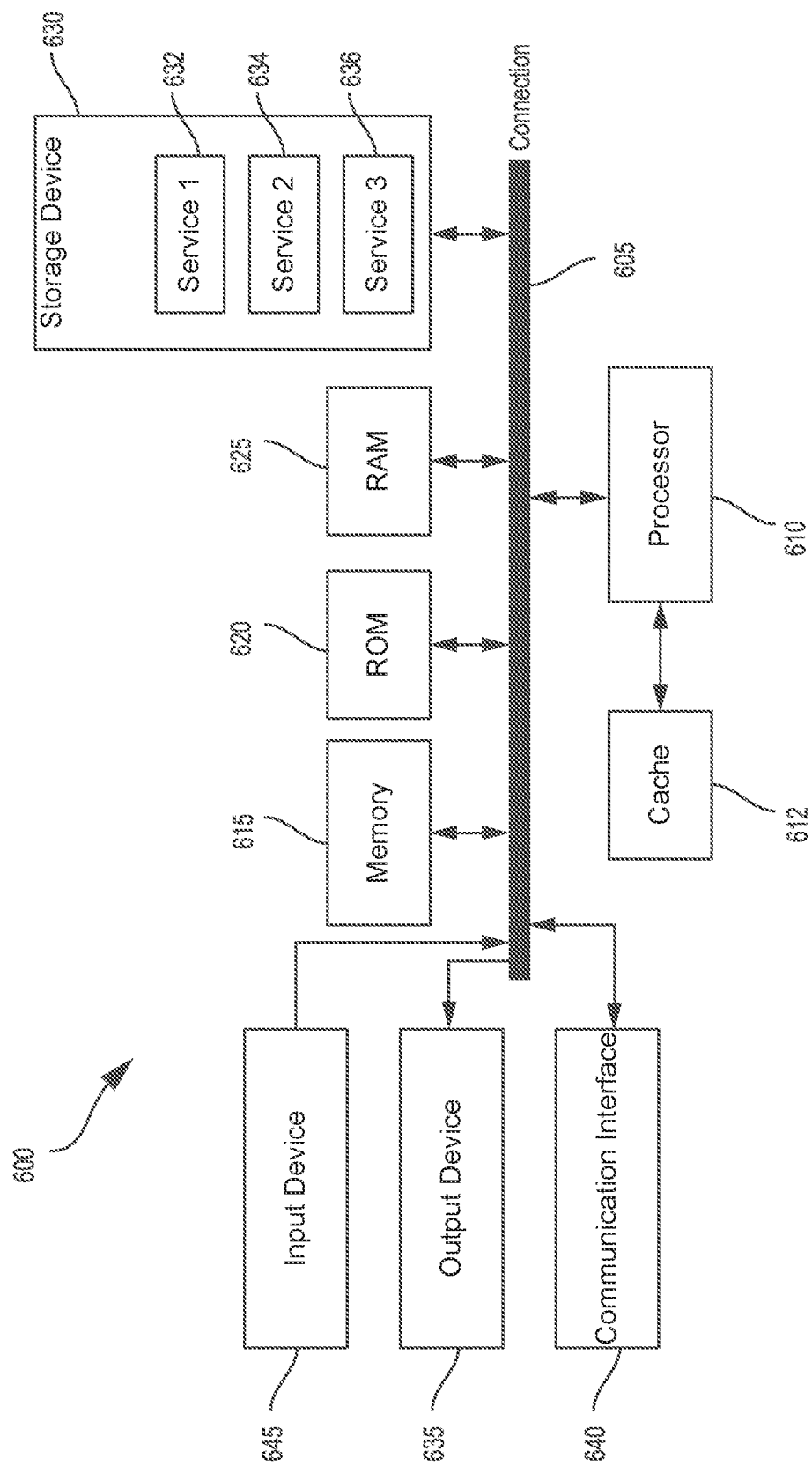
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A computer-implemented method comprising: navigating an autonomous vehicle (AV) along a roadway; receiving road data, by the AV, wherein the road data corresponds with at least one emergency vehicle; identifying the at least one emergency vehicle based on the road data; determining a pose of the at least one emergency vehicle in relation to at least one of the roadway and the AV; and determining if the roadway is closed based on the pose of the at least one emergency vehicle in relation to the at least one of the roadway and the AV.

Aspect 2. The computer-implemented method of Aspect 1, further comprising: determining a status of one or more lights associated with the at least one emergency vehicle; and determining if the roadway is closed based on the status of one or more lights associated with the at least one emergency vehicle.

Aspect 3. The computer-implemented method of Aspect 1 or 2, further comprising: determining a location of the at least one emergency vehicle in relation to the roadway; and determining if the roadway is closed based on the location of the at least one emergency vehicle in relation to the at least one of the roadway and the AV.

Aspect 4. The computer-implemented method of any of Aspects 1 to 3, further comprising: identifying at least one object proximate to the at least one emergency vehicle; and determining if the roadway is closed based on the identification of the at least one object proximate to the at least one emergency vehicle.

Aspect 5. The computer-implemented method of any of Aspects 1 to 4, further comprising: identifying at least one road closure sign proximate to the at least one emergency vehicle; and determining if the roadway is closed based on the identification of the at least one road closure sign proximate to the at least one emergency vehicle.

Aspect 6. The computer-implemented method of any of Aspects 1 to 5, wherein if it is determined that the roadway is closed, further: providing the AV with a route that avoids driving on the closed roadway; and navigating the AV along the route that avoids driving on the closed roadway.

Aspect 7. The computer-implemented method of any of Aspects 1 to 6, further providing a machine learning model for: identifying the at least one emergency vehicle; determining a pose of the at least one emergency vehicle in relation to the roadway; and determining if the roadway is closed based on the pose of the emergency vehicle in relation to the roadway.

Aspect 8. A system comprising: at least one memory; and at least one processor coupled to the at least one memory, the at least one processor configured to: navigate an autonomous vehicle (AV) along a roadway; receive road data, by the AV, wherein the road data corresponds with at least one emergency vehicle; identify the at least one emergency vehicle based on the road data; determine a pose of the at least one emergency vehicle in relation to at least one of the roadway and the AV; and determine if the roadway is closed based on the pose of the at least one emergency vehicle in relation to the at least one of the roadway and the AV.

Aspect 9. The system of Aspect 8, wherein the at least one processor is further configured to: determine a status of one or more lights associated with the at least one emergency vehicle; and determine if the roadway is closed based on the location of the at least one emergency vehicle in relation to the at least one of the roadway and the AV.

Aspect 10. The system of Aspect 8 or 9, wherein the at least one processor is further configured to: determine a location of the at least one emergency vehicle in relation to the roadway; and determine if the roadway is closed based on the location of the at least one emergency vehicle in relation to the roadway.

Aspect 11. The system of any of Aspects 8 to 10, wherein the at least one processor is further configured to: identify at least one object proximate to the at least one emergency vehicle; and determine if the roadway is closed based on the identification of the at least one object proximate to the at least one emergency vehicle.

Aspect 12. The system of any of Aspects 8 to 11, wherein the at least one processor is further configured to: identify at least one road closure sign proximate to the at least one emergency vehicle; and determine if the roadway is closed based on the identification of the at least one road closure sign proximate to the at least one emergency vehicle.

Aspect 13. The system of any of Aspects 8 to 12, wherein if it is determined that the roadway is closed, the at least one processor is further configured to: provide the AV with a route that avoids driving on the closed roadway; and navigate the AV along the route that avoids driving on the closed roadway.

Aspect 14. The system of any of Aspects 8 to 13, further providing a machine learning model to: identify the at least one emergency vehicle; determine a pose of the at least one emergency vehicle in relation to the roadway; and determining if the roadway is closed based on the pose of the emergency vehicle in relation to the roadway.

Aspect 15. A non-transitory computer-readable storage medium comprising at least one instruction for causing a computer or processor to: navigate an autonomous vehicle (AV) along a roadway; receive road data, by the AV, wherein the road data corresponds with at least one emergency vehicle; identify the at least one emergency vehicle based on the road data; determine a pose of the at least one emergency vehicle in relation to at least one of the roadway and the AV; and determine if the roadway is closed based on the pose of the at least one emergency vehicle in relation to the at least one of the roadway and the AV.

Aspect 16. The non-transitory computer-readable storage medium of Aspect 15, wherein the at least one instruction further causes a computer or processor to: determine a status of one or more lights associated with the at least one emergency vehicle; and determine if the roadway is closed based on the location of the at least one emergency vehicle in relation to the at least one of the roadway and the AV.

Aspect 17. The non-transitory computer-readable storage medium of Aspect 15 or 16, wherein the at least one instruction further causes a computer or processor to: determine a location of the at least one emergency vehicle in relation to the roadway; and determine if the roadway is closed based on the location of the at least one emergency vehicle in relation to the roadway.

Aspect 18. The non-transitory computer-readable storage medium of Aspects 15 to 17, wherein the at least one instruction further causes a computer or processor to: identify at least one object proximate to the at least one emergency vehicle; and determine if the roadway is closed based on the identification of the at least one object proximate to the at least one emergency vehicle.

Aspect 19. The non-transitory computer-readable storage medium of Aspects 15 to 18, wherein the at least one instruction further causes a computer or processor to: identify at least one road closure sign proximate to the at least one emergency vehicle; and determine if the roadway is closed based on the identification of the at least one road closure sign proximate to the at least one emergency vehicle.

Aspect 20. The non-transitory computer-readable storage medium of Aspects 15 to 19, wherein the at least one instruction further causes a computer or processor to: provide the AV with a route that avoids driving on the closed roadway; and navigate the AV along the route that avoids driving on the closed roadway.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising using a processor system to perform processor system operations comprising:

receiving in real time sensor data from a sensor system of an autonomous vehicle (AV);

wherein the sensor data is received at volumes and in a variety that enable the AV to self-navigate through a dynamic environment without a human driver, the dynamic environment comprising the AV and a plurality of objects;

using the sensor data to self-navigate the AV along a travel route comprising a roadway in the dynamic environment;

receiving road data, by the AV, wherein the road data comprises portions of the sensor data that correspond with at least one emergency vehicle in the dynamic environment, the at least one emergency vehicle having a pose;

identifying, based at least in part on the portions of the sensor data, that the plurality of objects includes the at least one emergency vehicle;

determining the pose of the at least one emergency vehicle in relation to at least one of the roadway and the AV;

determining if all traffic lanes of the roadway are closed based on the pose of the at least one emergency vehicle in relation to the at least one of the roadway and the AV; and responsive to a result of the determining if all of the traffic lanes of the roadway are closed, determining whether to adjust the travel route to avoid the roadway.

2. The computer-implemented method of claim 1, the processor system operations further comprising:

determining whether emergency light on with the at least one emergency vehicle are flashing; and determining if all of the traffic lanes of the roadway are closed is further based on the determination of whether the emergency lights located on the at least one emergency vehicle are activated.

3. The computer-implemented method of claim 1, the processor system operations further comprising:

determining a location of the at least one emergency vehicle in relation to the roadway; and determining if all of the traffic lanes of the roadway are closed is further based on the location of the at least one emergency vehicle in relation to the at least one of the roadway and the AV.

4. The computer-implemented method of claim 1, the processor system operations further comprising:

identifying at least one object proximate to the at least one emergency vehicle; and determining if all of the traffic lanes of the roadway are closed is further based on the identification of the at least one object proximate to the at least one emergency vehicle.

5. The computer-implemented method of claim 1, the processor system operations further comprising:

identifying at least one road closure sign proximate to the at least one emergency vehicle; and determining if all of the traffic lanes of the roadway are closed is further based on the identification of the at least one road closure sign proximate to the at least one emergency vehicle.

6. The computer-implemented method of claim 1, wherein if it is determined that there are closed portions of the roadway based on the determination that all of the traffic lanes of the roadway are closed, the processor system operations further comprise:

providing the AV with a revised travel route that avoids driving on the closed portions of the roadway; and navigating the AV along the revised travel route that avoids driving on the closed portions of the roadway.

7. The computer-implemented method of claim 1, the processor system operations further comprise using a machine learning model for:
identifying the at least one emergency vehicle;
determining the pose of the at least one emergency vehicle in relation to the roadway; and
determining if all of the traffic lanes of the roadway are closed based on the pose of the emergency vehicle in relation to the roadway.

8. A system comprising:
at least one memory; and
at least one processor coupled to the at least one memory, the at least one processor system configured to:
receive in real time sensor data from a sensor system of an autonomous vehicle (AV);
wherein the sensor data is received at volumes and in a variety that enable the AV to self-navigate through a dynamic environment without a human driver, the dynamic environment comprising the AV and a plurality of objects;
use the sensor data to self-navigate the AV along a travel route comprising a roadway in the dynamic environment;
receive road data, by the AV, wherein the road data comprises portions of the sensor data that correspond with at least one emergency vehicle in the dynamic environment, the at least one emergency vehicle having a pose;
identify, based at least in part on the portions of the sensor data, that the plurality of objects includes the at least one emergency vehicle;
determine the pose of the at least one emergency vehicle in relation to at least one of the roadway and the AV;
determine whether all traffic lanes of the roadway are closed based on the pose of the at least one emergency vehicle in relation to the at least one of the roadway and the AV; and
responsive to a result of the determination of whether all of the traffic lanes of the roadway are closed, determine whether to adjust the travel route to avoid the roadway.

9. The system of claim 8, wherein the at least one processor system is further configured to:
determine whether one or more emergency lights on the at least one emergency vehicle are activated; and
determine whether all of the traffic lanes of the roadway are closed further based on the determination of whether the one or more emergency lights on the at least one emergency vehicle are activated.

10. The system of claim 8, wherein the at least one processor system is further configured to:
determine a location of the at least one emergency vehicle in relation to the roadway; and
determine whether all of the traffic lanes of the roadway are closed further based on the location of the at least one emergency vehicle in relation to the roadway.

11. The system of claim 8, wherein the at least one processor system is further configured to:
identify at least one object proximate to the at least one emergency vehicle; and
determine whether all of the traffic lanes of the roadway are closed further based on the identification of the at least one object proximate to the at least one emergency vehicle.

12. The system of claim 8, wherein the at least one processor system is further configured to:

identify at least one road closure sign proximate to the at least one emergency vehicle; and
determine whether all of the traffic lanes of the roadway are closed further based on the identification of the at least one road closure sign proximate to the at least one emergency vehicle.

13. The system of claim 8, wherein if it is determined that there are closed portions of the roadway based on the determination that all of the traffic lanes of the roadway are closed, the at least one processor system is further configured to:
provide the AV with a revised travel route that avoids driving on the closed portions of the roadway; and
navigate the AV along the revised travel route that avoids driving on the closed portions of the roadway.

14. The system of claim 8, wherein the processor system further comprises a machine learning model configured to:
identify the at least one emergency vehicle;
determine the pose of the at least one emergency vehicle in relation to the roadway; and
determine whether all traffic lanes of the roadway are closed based on the pose of the emergency vehicle in relation to the roadway.

15. A non-transitory computer-readable storage medium comprising at least one instruction for causing a computer or a processor system to:
receive in real time sensor data from a sensor system of an autonomous vehicle (AV);
wherein the sensor data is received at volumes and in a variety that enable the AV to self-navigate through a dynamic environment without a human driver, the dynamic environment comprising the AV and a plurality of objects;
use the sensor data to self-navigate the AV along a travel route comprising a roadway in the dynamic environment;
receive road data, by the AV, wherein the road data comprises portions of the sensor data that correspond with at least one emergency vehicle in the dynamic environment, the at least one emergency vehicle having a pose;
identify, based at least in part on the portions of the sensor data, that the plurality of objects includes the at least one emergency vehicle;
determine the pose of the at least one emergency vehicle in relation to at least one of the roadway and the AV;
determine whether all traffic lanes of the roadway are closed based on the pose of the at least one emergency vehicle in relation to the at least one of the roadway and the AV; and
responsive to a result of the determination of whether all of the traffic lanes of the roadway are closed, determine whether to adjust the travel route to avoid the roadway.

16. The non-transitory computer-readable storage medium of claim 15, wherein the at least one instruction further causes the computer or the processor system to:
determine whether one or more emergency lights on the at least one emergency vehicle are activated; and
determine whether all of the traffic lanes of the roadway are closed further based on the determination of whether the one or more emergency lights on the at least one emergency vehicle are activated.

17. The non-transitory computer-readable storage medium of claim 15, wherein the at least one instruction further causes the computer or the processor system to:
determine a location of the at least one emergency vehicle in relation to the roadway; and determine whether all of the traffic lanes of the roadway are closed further based on the location of the at least one emergency vehicle in relation to the roadway.

18. The non-transitory computer-readable storage medium of claim 15, wherein the at least one instruction further causes the computer or the processor system to:
identify at least one object proximate to the at least one emergency vehicle; and
determine whether all of the traffic lanes of the roadway are closed further based on the identification of the at least one object proximate to the at least one emergency vehicle.

19. The non-transitory computer-readable storage medium of claim 15, wherein the at least one instruction further causes the computer or the processor system to:
identify at least one road closure sign proximate to the at least one emergency vehicle; and
determine whether all of the traffic lanes of the roadway are closed further based on the identification of the at least one road closure sign proximate to the at least one emergency vehicle.

20. The non-transitory computer-readable storage medium of claim 15, wherein the at least one instruction further causes the computer or the processor system to:
responsive to a determination that there are closed portions of the roadway based on the determination that all of the traffic lanes of the roadway are closed, provide the AV with a revised travel route that avoids driving on the closed portions of the roadway; and
navigate the AV along the revised travel route that avoids driving on the closed portions of the roadway.

\* \* \* \* \*